Feb. 9, 1965    A. CALA    3,168,749
FABRIC HEM
Filed Feb. 15, 1963    2 Sheets-Sheet 1

Fig. 6 bis 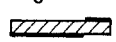

INVENTOR
ABRAM CALA
By
OSTROLENK, FABER, GERB & SOFFEN
ATTORNEYS

Feb. 9, 1965  A. CALA  3,168,749
FABRIC HEM
Filed Feb. 15, 1963  2 Sheets-Sheet 2
Fig. 16
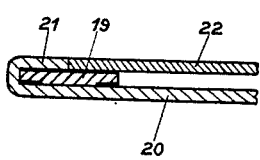
Fig. 17
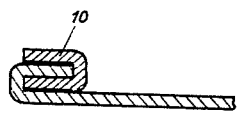
Fig. 18
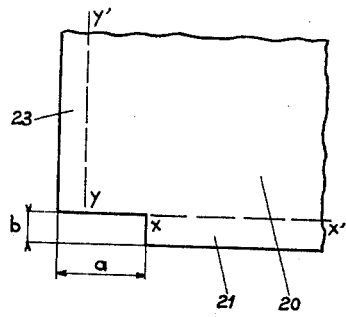
Fig. 19
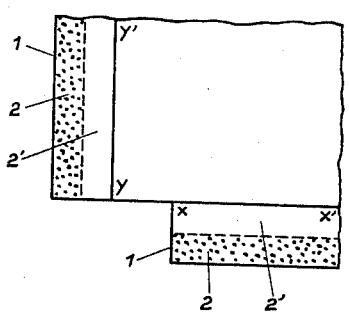
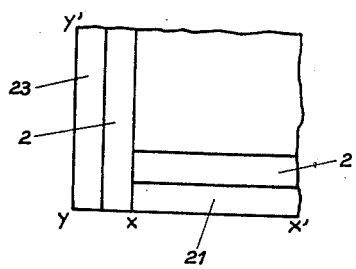
Fig. 20
Fig. 21
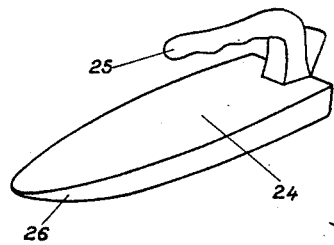
INVENTOR
ABRAM CALA
BY
OSTROLENK, FABER, GERB & SOFFEN
ATTORNEYS 3,168,749
FABRIC HEM
Abram Cala, 43 Rue du Pont de Creteil,
Saint-Maur, France
Filed Feb. 15, 1963, Ser. No. 258,884
2 Claims. (Cl. 2—243)

The present invention relates to a new fabric hem, and to a method for the production of this hem or, in more general fashion, of any superimposition of a plurality of thicknesses of a fabric, a fur or a similar material. The invention also relates to a new product serving for the obtaining of hems, cuffs, facings, epaulettes, etc., by the new method.

The hems, facings, epaulettes or other superimpositions of at least two thicknesses of a fabric, with or without folding of the latter, are conventionally obtained by sewing, which does not always respond to the necessities of rapidity required in our day. Furthermore the line of sewing often appears on the article, such as garment, linen, covers or other articles, impairing the appearance of the article. Furthermore when it becomes necessary to unmake a seam, the undoing of the stitches requires time and generally leaves more or less visible traces on the garment or other article in question.

The present invention provides a means for producing hems, or similar superimpositions of fabric, with very great rapidity, without permitting anything to appear on the exterior of the article. It also permits of obtaining a more solid connection than sewing, while leaving the possibility of unmaking the seam very rapidly, without any apparent trace. The method of the invention further facilitates work in more or less inaccessible parts such for example as the epaulettes or sleeves. A further advantage consists in the obtaining of sealed hems, into which dust or other foreign material cannot penetrate, which at the same time reduces the causes of wear of the article and improves its hygienic state. The invention also permits of reinforcing the fabric and imparting firmness to it. By virtue of the present invention numerous tasks can be executed with better productivity and at better price.

The method according to the invention comprises adhering one face of an elongated adhesive-coated tape to a fabric, fur or other similar sheet material lengthwise of and slightly spaced from the edge thereof, the tape being coated with laterally offset adhesive layers on its opposite faces, folding the sheet material over the adhesive-coated tape and thereafter adhering the edge of the folded-over portion of the sheet material to the opposite face of the tape, the folded-over portion thereby covering the adhesive layer on such opposite face and defining a continuous, smooth edging for the sheet material.

Thus a hem—instead of being produced by sewing of two strips of fabric folded one upon the other—is obtained by the interposition of an adhesive between these strips.

The adhesive used can be constituted by a glue of suitable flexibility, applicable and acting at ambient temperature or in the hot state, or by a thermo-plastic material.

In view of the possibility of applying the adhesive in a more or less wide area, between the strips of fabric, felt, fur, etc., in place of a simple line of sewing, there is the advantage that the securing power between the superimposed layers can be regulated at will.

The preferred form of embodiment of the invention, which is particularly practical and advantageous, consists in placing between the faces of the fabric, material, fur, felt, or other sheet to be united, an adhesive tape, preferably sticking to the fabric only in the hot state, and then impressing the whole with an iron brought to suitable temperature in order to effect the sticking.

The best results are obtained with adhesive tapes based on a flexible, thermo-weldable plastic material. The tape can be entirely of this plastic material or an adequate support, covered and/or impregnated with suitable thermoplastic resin.

The use of thermo-weldable tapes possesses the advantage of permitting the convenient placing of the desired length and width of tape which does not stick in the cold state, between the faces of the fabrics to be united, before passing the hot iron over the whole. It is in effect much more convenient to handle and exactly adjust such a tape than a cold-adhesive strip, or a liquid glue which must first be spread over the fabric.

It can be observed that the method of the invention permits of obtaining a well made hem without thread, without needle or sewing machine, with the aid of simply an adhesive tape and a pressing iron. Thus it is possible rapidly, and at reduced expense, to effect all necessary superimpositions, such as hems, cuffs, epaulettes, sleeves, etc., in very diverse articles, garments or others. More especially the method is applied with great advantage to coats, jackets, trousers, dresses, raincoats, lumber-jackets, dressing gowns, pajamas, blouses, waistcoats, overalls, working garments, shirts, pants, shorts, vests, cloaks, ladies' jackets, skirts, wrappers, anoraks, natural or artificial furs, covers, cushions, etc., the above articles being quoted only by way of examples of application.

The form of embodiment consisting in using an adhesive tape formed by a support provided with a thermoplastic material possesses the advantage of giving rise to different variants, the main ones of which will be described hereinafter.

The support of the said tapes is, according to need, an ordinary fabric, such for example as a cloth, of greater or lesser strength and/or beauty: Cloth, silk, poplin, etc. It may possibly be constituted by an unwoven sheet, such as cellophane, polyester, paper, fur, leather etc. It is in fact possible to apply the adhesive tape in invisible fashion or on the other hand to cause it to play a decorative part itself, the tape possibly being coloured and/or having a specific design.

The adhesive tape according to the invention, which constitutes a new industrial product, can be presented in different forms.

In a first form of embodiment the support of the tape is provided with adhesive over all or part of its two faces: It is impregnated and/or coated therewith. The adhesive areas are continuous or discontinuous; they extend uniformly along the tape, in one or more straight, curved or broken lines, or constitute series of surfaces separated by non-adhesive regions; such surfaces can have various geometric forms, for example circles, polygons, streaks, etc., of any desired dimensions. In the case where it is of interest to secure the two faces of a hem at points, and not along a continuous line, it is possible to use a tape the adhesive of which is distributed in the form of a series of small circular, polygonal or other areas. These areas can possibly form transverse streaks in relation to the length of the tape.

A particular form of embodiment consists of a support tape of which one face carries the thermo-weldable plastic material in a longitudinal area covering only a part of the width of the tape; the opposite face, that is to say the reverse of the tape, carries a similar area but situated where the front is not provided with plastic.

In a variant which is useful for the obtaining of a hem and simultaneous securing of a lining, the front of the tape is entirely covered with adhesive while the reverse is covered only over a part of its width. The front may carry two longitudinal areas of plastic along the two edges of the tape, separated by a non-adhesive part; the reverse is then provided with an area which can be situated opposite one of the areas of the front, or behind the central part which is not provided with plastic.

The most current form of adhesive tapes according to the invention is rectilinear; however for certain parts of garments it can be useful to use curved tapes.

The width of the tape depends naturally upon the nature of the work to be effected, and in particular upon the width of the hem or facing to be obtained. Most frequently this width is of about 1 to 10 cm., and generally 2 to 4 cm., but naturally wider or narrower tapes can be used according to need.

As regards the length, in principle it is unlimited, since the user can cut exactly what is needed for the given work. Also the preferred form of presentation of the tapes according to the invention is in rolls of greater or lesser total lengths, for example 10, 50 or 100 metres, etc.

However for certain tasks where specific lengths are used, adhesive tapes are distributed in these standard lengths, for example 20 cm., 35 cm., etc.

It should be noted that the fabric serving for the preparation of the adhesive tapes according to the invention can be cut in the direction of the width, of the length or on the bias.

For the realization of the invention very numerous adhesives can be selected from those which are at present supplied by the producers of glues and thermo-plastic materials. Use may be made especially of products based on polyesters, polyacrylonitrile, polyamides, synthetic rubbers, polyolefines, especially polyethylene, epoxy resins, vinyl resins such for example as polyvinyl chloride, acetate, aceto-chloride, acetal or butyral, cellulose derivatives, elastomers of butadiene-acrylonitrile, butadiene-styrene or polyisobutene, polyurethanes, etc.

The products which are insoluble in the solvents usually used for dry-cleaning are especially recommendable, especially those which are insoluble in the chlorinated solvents such as trichloroethylene or perchloroethylene. This is the case especially with the thermo-plastic materials based on polyamides, polyethylene and polyacrylonitrile. Garments the hems of which are produced with the aid of adhesive tapes impregnated or coated with such materials can consequently be subjected to dry-cleaning without any damage to the hems.

The coating and impregnation of fabrics with plastic materials or with glues are well-known industrial operations, thus there is no need to describe here their application to the manufacture of adhesive tapes according to the invention. It will be noted only that tapes thus provided with thermo-weldable material known in commerce under the name of "polythene" are particularly advantageous. As adhesive resistant to solvents one may quote by way of example the glues sold under the trade marks "Bostik 1410" and "Bostik 1769."

The carrying out of the invention, especially in the case of hot welding of the adhesive tape to the fabric, requires a suitable control of the temperature. In this operation the temperature of the pressing iron must be regulated so that the thermo-weldable plastic material becomes sufficiently fluid; the thermal conditions to be respected for the various usable plastic materials are published in well-known tables and articles. However it is preferable to carry out the welding of the adhesive tapes according to the invention at temperatures not exceeding 150° C. approximately.

This applies equally to the case where the adhesive used is thermo-hardenable, as for example a glue based on epoxy resin, polyester, polyurethane, etc.

Although the use of the pressing iron is very practical, the welding of the tapes can be effected with the aid of any other suitable tool, possibly between the plates of a press.

When the welding has been effected correctly, that is to say under the best conditions of temperature and pressure, corresponding to the adhesive material and the fabric used, a very solid securing is obtained, but it is nevertheless possible to unmake the hem by pulling upon the welded parts of the fabric; no pulling away of the fabric nor tearing takes place. Furthermore it is sufficient to repress with heat the refolded assembly so that the old tape present rewelds the two internal faces of the hem to one another; the hem is thus reconstituted without the addition of adhesive tape. This is advantageous for example in the course of cleaning of the garment, or when it is a matter of correcting an error of assembly or tailoring of the article.

The welding of the adhesive tapes can be particularly well effected by means of a special pressing iron according to the invention. This new iron is characterised in that it possesses a greater ratio of length to width than in the known irons. Furthermore its handle, placed to the rear, has a length and shape such that the major part of the space above the sole is well clear. The contour of the base of the sole is preferably suitably rounded. The length:width ratio of the new iron is preferably between 3 and 10, or better between 4 and 6. Practically the iron generally possesses a length of 12 to 30 cm. and preferably 16 to 24; its width can be 2 to 8 cm. for example, and the best 4 to 6. For example an iron of 20 cm. length and 5 cm. width is especially suitable.

It is recommendable that the weight of the iron should be about 20 to 30 g. per sq. cm. of bearing surface. In other words an iron of 20 x 5 cm. weighs for example preferably 2 to 3 kg.

According to a very advantageous characteristic, the handle of the new iron is such that at least the forward half of the iron is entirely clear; in this manner the front of the sole can be easily introduced into a sleeve or another narrow part of a garment or article, in order to press an adhesive tape against the fabric therein, without the necessity of turning the sleeve inside out.

The iron according to the invention can be heated by any conventional means; it is very advisable to use the known electric heating device, regulable to the adequate temperature.

The edges of the bearing part of the sole, at least in the forward region are rounded, with the object of avoiding the mark frequently produced by the usual irons on certain delicate fabrics. The rounding of the sole is translated as a spacing between the widths of the upper and lower faces, which spacing can advantageously be of the order of 1 millimetre to several millimetres.

In order to illustrate the invention several forms of embodiment are represented by way of non-limitative examples in the accompanying drawings.

FIGURES 1 to 5 represent pieces of several different adhesive tapes in plan view.

FIGURES 6, 6 bis and 7 to 10 are cross-sections of different kinds of adhesive tapes represented with a thickness which is intentionally exaggerated for the purpose of better understanding of the drawing.

FIGURES 11 to 17 show cross-sections of several different hems, also with intentionally enlarged thicknesses.

FIGURE 18 is a plan view of a part of a garment prepared for the formation of a hem and a facing.

FIGURE 19 shows in plan view an operational phase concerning the garment in FIGURE 18.

FIGURE 20 is a definitive plan view of the hem and the facing according to FIGURES 18 and 19.

FIGURE 21 represents in perspective a new pressing iron which is particularly useful for the operations according to the invention.

Figure 1:
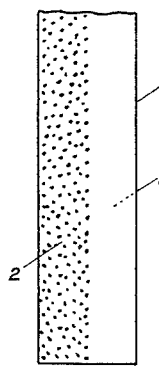
Figure 6:
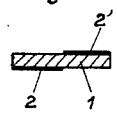

In FIGURE 1 there is shown a support tape 1 of fabric or other material provided with a longitudinal area 2 of adhesive on the front face, and a similar adhesive area 2' on the rear face. The cross-section of this tape is represented in FIGURE 6 where the thickness of the support 1 and of the adhesive layers 2 and 2' has been greatly increased for clarity of the drawing. The layers of thermoweldable plastic material or glue 2 and 2' are shown in thick black lines, in relief on the support 1;

in reality when the support is a fabric, for example cloth, as is most frequently the case, the adhesive at least partially impregnates the fabric and does not form an excess thickness or forms practically no excess thickness.

In the particular case of FIGURES 1 and 6 the two adhesive areas on the opposite faces have the same width; for certain work it is useful that these areas should have different extents, as shown by FIGURE 6 bis.

Figure 2:
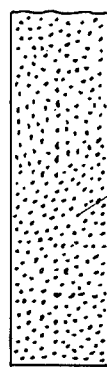
Figure 7:
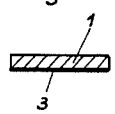

FIGURES 2 and 7 relate to a support 1 carrying a thermoweldable coating 3 on only one of its two faces.

Figure 3:
Figure 4:
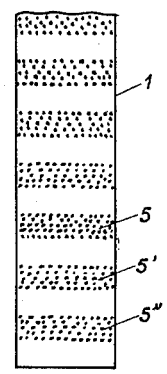
Figure 8:
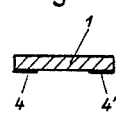

A variant according to FIGURES 3 and 8 comprises the support 1 of which the edges carry two adhesive areas 4 and 4' of limited widths on only one face. The coating or impregnation can be fixed on the support 1 in the form of a series of streaks or transverse areas, shown in FIGURE 4 at 5, 5', 5" etc.

Figure 5:
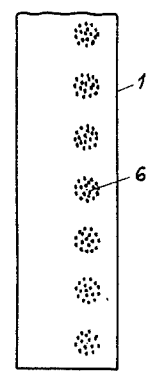
Figure 9:
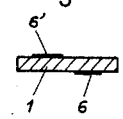

Tapes according to another variant may be seen from FIGURE 5 where a series of small adhesive areas 6 is situated on one of the faces of the support 1, and a series of similar areas 6' on the other face, as shown by FIGURE 9.

Figure 10:
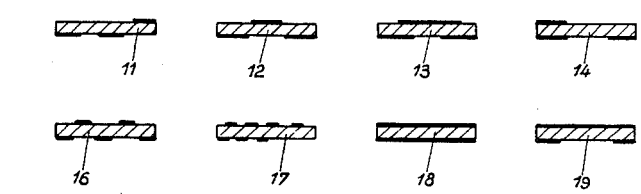

In order to show several other possible arrangements of the areas, streaks or adhesive points on the tape, in FIGURE 10 there have been united the cross-sections of different types of tapes carrying the references 10 to 19. Naturally numerous other arrangements can be used according to need.

Figure 11:
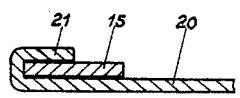

FIGURE 11 shows in cross-section, still with intentionally enlarged thicknesses, a hem 21 obtained on the edge of a fabric 20 by means of an adhesive tape 15. The thick lines represent the adhesive material showing how one of the faces of the tape 15 is entirely stuck upon the fabric 20 while the half of the other face of 15 is similarly stuck against the interior of the hem 21.

Figure 12:
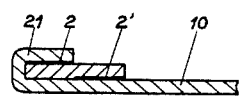

The hem according to FIGURE 12 is obtained with the aid of the tape according to FIGURES 1 and 6.

Figure 13:
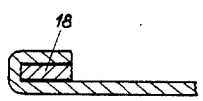

The use of a tape of the same width as that of the hem is illustrated by FIGURE 13 by means of the tape 18 stuck on both its faces.

Figure 14:
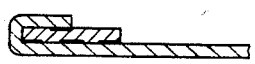

A variant which is the object of FIGURE 14 corresponds to the use of an adhesive tape fixed to the fabric on several longitudinal areas which are quite narrow; the tape used here is similar to the tapes 11 and 16 in FIGURE 10.

Figure 15:
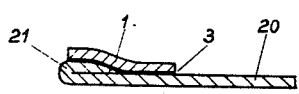

A hem can also be obtained with the aid of tapes such as those according to FIGURES 7 and 8, by sticking of the tape above the turned-over part 21 of the hem and the fabric 20; this is illustrated in FIGURE 15, and applies preferably to the thinner fabrics; when 20 has a slight thickness, the curvature of the support 1, which appears exaggeratedly in FIGURE 15, by reason of the excessively great thickness of the sections, practically does not exist and the hem has a pleasing appearance, especially if the tape is decorative.

In FIGURE 16 there is represented the application of an adhesive tape 19 for the obtaining of the hem 21 and simultaneously the securing of a lining 22. When the tape 19 is provided with a layer of thermo-weldable material, the two operations can even be effected with one single action of the pressing iron on the back of the hem 21 and of the lining 22 opposite the adhesive layer.

The lining can also be applied with the aid of certain other of the tapes according to the invention, possibly two tapes, the first securing the hem, the second the lining.

One particular case concerning the use of a folded tape is illustrated in FIGURE 17.

FIGURE 18 represents the bottom of the fabric 20 of a garment upon which a hem and a facing must be executed. A notch or opening, formed in the angle, is defined by the dimensions $a$ and $b$.

$a$ is the width of a thermo-weldable tape 1 like that according to FIGURES 1 and 6, increased by the width of the facing 23; the latter is equal to that of the coated part 2 or 2' of the tape 1; if the tape 1 is coated over half its width, as is the case in FIGURES 1 and 6, $a=1.5$ times the width of the tape 1;

$b$ is the coated width 2 or 2' of the tape 1, or possibly of another adhesive tape; it is equal to half the width of the tape for the present case;

$xx'$ is the line of future folding of the hem 21; $yy'$ is the line of future folding of the facing 23.

FIGURE 19 represents the reverse of the garment 20 on which the two adhesive tapes 1 have been placed in position, respectively on the strip of fabric 21 and 23. These tapes 1 are disposed in such fashion that the coated part 2' of each of them is in contact with the reverse of the fabric 20, the part 2 overlapping the garment towards the exterior.

The securing of the thermo-weldable tapes is effected with the aid of a pressing iron brought to a suitable temperature, for example 145° C. in the case of polythene, the adhesion is immediate.

FIGURE 20 shows the facing 23 and the hem 21 folded on the lines $yy'$ and $xx'$. The coated parts 2 of the adhesive tapes are turned down on the back of the fabric 20 and adhere thereto automatically, after the application of the pressing iron, as indicated previously.

The facing and/or the hem according to FIGURE 20 can also be formed each in one single pressing operation. For this purpose the tapes 1 are placed on the edges of the fabric 20 in their final positions represented in FIGURE 20, the coated part 2 against the fabric, and the part 2' upwards. Then the fabric is folded along $xx'$ and $yy'$, the strips 23 and 21 being turned over upon the coated part 2' of the respective adhesive tapes. It then only remains to pass the hot iron over the parts thus superimposed in order to secure them.

FIGURE 21 shows one of the possible forms of embodiment of the new pressing iron for securing the adhesive tapes to the fabric. The sole 24 of this iron has a length of about 20 cm. to a width of 5 cm. at the rear, which signifies a very elongated shape. The handle 25 is situated and shaped in such fashion as to leave an important part at the front of the iron, especially over more than 10 cm., entirely free and accessible on all sides. The iron thus can enter up to at least 10 cm. in depth into sleeves, pockets, etc., in order to press the adhesive securing tapes therein.

A rounding 26 on the periphery, forming a withdrawal of 1 mm. of the bearing surface in relation to the upper surface of the iron, permits of working without ever leaving marks on the fabric.

It is of course understood that various aspects of the invention, illustrated by the above-described drawings, do not in any way limit the invention, it being possible for diverse variants or applications to be carried out without departing from the scope of the invention. It is for example possible very advantageously to use adhesive tapes for the securing of strips of cloth which are usually introduced into the facings of garments.

I claim:

1. A fabric garment having a hem defined by a first portion of the fabric folded over upon itself along a line equidistant from a first edge thereof to define said hem, the hem being affixed by an elongated tape of flexible sheet material having a first portion which is coextensive with the fabric from the fold line of the hem to the edge of the fabric and a second portion which extends beyond the edge of the fabric, said portion of said tape which is coextensive with said fabric being coated with an adhesive on the side of said tape facing said fabric and being adhered to said fabric throughout said coextensive area, said portion of said tape which extends beyond said fabric edge being coated with an adhesive on the opposite side of said tape from said first adhesive coating and adhered to the portion of the fabric laterally adjacent said folded portion throughout substantially the entire length of said folded over portion to define a facing.

2. The garment as defined in claim 1, including a second hem disposed at right angles to said first hem and defined by a second portion of the fabric folded over upon itself along a line equidistant from a second edge thereof to define said second hem, the hem being affixed by an elongated tape of flexible sheet material having a first portion which is coextensive with the fabric from the fold line of the hem to the edge of the fabric and a second portion which extends beyond the edge of the fabric, said portion of said tape which is coextensive with said fabric being coated with an adhesive on the side of said tape facing said fabric and being adhered to said fabric throughout said coextensive area, said portion of said tape which extends beyond said fabric edge being coated with an adhesive on the opposite side of said tape from said first adhesive coating and adhered to the portion of the fabric laterally adjacent said folded portion throughout substantially the entire length of said folded over portion to define a facing; said first and second tapes being disposed adjacent to one another in non-overlapping relation.

References Cited by the Examiner
UNITED STATES PATENTS

| | | | |
|---|---|---|---|
| 1,432,127 | 10/22 | Schwartz | 2—131 |
| 2,435,509 | 2/48 | Pfeffer et al. | 2—131 |
| 2,860,081 | 11/58 | Eiken | 2—232 X |
| 3,097,364 | 7/63 | Hess | 2—243 X |

JORDAN FRANKLIN, *Primary Examiner.*